(12) United States Patent
Weinerth et al.

(10) Patent No.: US 6,423,817 B1
(45) Date of Patent: Jul. 23, 2002

(54) INHERENTLY LIGHT- AND HEAT-STABILIZED POLYAMIDES

(75) Inventors: Klaus Weinerth, Neustadt; Karlheinz Mell, Ludwigshafen; Paul Matthies, Heidelberg; Ludwig Beer, Ludwigshafen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 08/722,048
(22) PCT Filed: Apr. 12, 1995
(86) PCT No.: PCT/EP95/01349
§ 371 (c)(1),
(2), (4) Date: Dec. 31, 1996
(87) PCT Pub. No.: WO95/28443
PCT Pub. Date: Oct. 26, 1995

Related U.S. Application Data

(63) Continuation of application No. 08/722,048, filed on Dec. 31, 1996.

(30) Foreign Application Priority Data

Apr. 15, 1994 (DE) .......................... 44 13 177
Aug. 17, 1994 (DE) .......................... 44 29 089

(51) Int. Cl.⁷ .................... C08G 69/08; C08G 73/10; C08L 77/00
(52) U.S. Cl. .................... 528/310; 528/170; 528/322; 528/323; 528/332; 528/335; 528/336; 525/142; 525/195; 525/327.6; 525/375; 524/99; 524/103; 524/538; 524/600; 524/606; 428/357; 428/364; 428/394; 428/395; 442/49; 442/181
(58) Field of Search .................... 528/170, 323, 528/310, 322, 332, 335, 336; 524/99, 103, 538, 600, 606; 525/142, 194, 327.6, 375; 428/357, 364, 395, 396; 442/49, 181

(56) References Cited

U.S. PATENT DOCUMENTS

| | | | |
|---|---|---|---|
| 3,684,765 A | 8/1972 | Matsui et al. | 524/99 |
| 4,153,596 A | 5/1979 | Oertel et al. | 260/45.8 |
| 4,692,486 A | 9/1987 | Gugumus | 524/100 |
| 4,743,657 A | 5/1988 | Rekers et al. | 525/281 |
| 5,149,758 A | 9/1992 | Matthies | 528/318 |

FOREIGN PATENT DOCUMENTS

| | | |
|---|---|---|
| DE | 20 40 975 | 8/1970 |
| DE | 32 33 951 | 9/1982 |
| DE | 32 33 953 | 9/1982 |
| DE | 39 22 912 | 10/1989 |
| EP | 0 345 648 | 12/1989 |
| EP | 379 470 | 7/1990 |
| FR | 2074871 | 9/1971 |
| FR | 2513646 | 4/1983 |
| GB | 2107719 | 5/1983 |
| JP | 50-01223 | * 8/1993 |
| WO | 91103511 | 3/1991 |

OTHER PUBLICATIONS

Patent Abst. of Japan, vol. 17, No. 251 (C-1060) (English abstract of JP 5001223, Jan. 8, 1993).
"Degradation and Stabilisation of Nylon 6,6" Thesis dated Sep. 01, 1989, pp. 133-144.
"LOY—MOY—POY—HOY—FOY?", Man-Made Fiber Yearbook (CCT), 1986.
"Heavy-Duty high speed take-up heads SW4S support the advance spin-drawing and high-speed spinning", BARMAG Information Service No. 08/1973.
"Modern high-speed spinning machines", Chemiefasern Textilindustrie English Translation vol. 35/87, E9-E13 (1985).
Excerpt from "Kagaku Seni II" (a Japanese textbook), marked as "Exhibit No. KAP 9" including English language translation (1990; currently no additional information available).
Excerpt from a Japanese textbook cited in the Korean proceedings (1989; currently no translation or additional information available).
"Thermal and Photo-chemical Degradation of Nylon 6,6 Polymer . . .", Polymer Degradation and Stability 21 (1988), 251–262.
"New high-speed spinning process for nylon 6,6 flat yarn", Chemiefasern Textilindustrie English Translation vol. 33/85, pp. E69-E71 (1983).

* cited by examiner

Primary Examiner—P. Hampton-Hightower
(74) Attorney, Agent, or Firm—Keil & Weinkauf

(57) ABSTRACT

A process for preparing inherently light- and heat-stabilized polyamides comprises polymerizing in the presence of at least one triacetonediamine compound of the formula

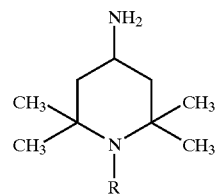

where R is hydrogen or hydrocarbyl having from 1 to 20 carbon atoms, preferably alkyl having from 1 to 18 carbon atoms, or benzyl.

29 Claims, No Drawings

INHERENTLY LIGHT- AND HEAT-STABILIZED POLYAMIDES

This is a Continuation Application of application Ser. No. 08/722,048, filed on Dec. 31, 1996, which is a National Stage application under 35 U.S.C. 371, based on International Application No. PCT/EP 95/01,349, filed Apr. 12, 1995.

BACKGROUND OF THE INVENTION

1. Field of the Invention

The present invention relates to improved polyamides. More particularly, the present invention relates to inherently light- and heat-stabilized polyamides. The present invention further relates to a process for preparing these polyamides and to their use.

2. Description of the Related Art

The heat stability of polyamides, including nylon 6 and nylon 66, is insufficient for some applications. For instance, coloration problems can arise as a result of chemical changes (oxidative/thermal damage) to the polymer during carpet yarn or textile fabric heat setting. Both continuous filaments and staple fibers may be affected. It is known to add stabilizers to the polyamide to improve these properties. Such an addition can take place before, during or after the polymerization, for example during the processing. The customary known stabilizers are mixed into the polymer and are not bonded to the polymer chain. During processing or use they can migrate, evaporate or wash out of the polymer more or less readily, so that the effectiveness of the stabilization decreases in an undesirable manner and the surroundings (air, dyebath) may become contaminated.

DE-A-20 40 975, Sankyo Co. Ltd., describes the stabilization of synthetic polymers, including polyamides, with 4-aminopiperidine derivatives. Among the multiplicity of 4-aminopiperidine derivatives disclosed therein is 4-amino-2,2,6,6-tetramethylpiperidine (ef. No. 32 on page 8 of the document). However, this piperidine derivative is neither particularly singled out nor used in any Example. According to this reference, the 4-aminopiperidine derivatives are mixed with the ready-prepared polymer without becoming attached to the polymer chain.

DE-C-39 32 912, Sandoz, concerns polyamides containing radicals with sterically hindered amino groups, especially 2,2,6,6-tetramethyl-4-piperidyl radicals, incorporated in the molecule. The number of radicals is from 5 to 200 per polyamide molecule on average. According to this reference, these polyamides are useful, inter alia, for improving the dyeability of polyamides and as light stabilizers for plastics; they are to be incorporated in amounts of 1–10% by weight, particularly in the melt.

A paper in Poly. Deg. and Stab. 21, 251–262 (1988), states that the light stability of nylon 66 is improved on addition of 2,2,6,6-tetramethyl-4-piperidinol (TMP). The authors assume (see p. 259) that the TMP has reacted with the carboxyl end groups of the polyamide during a melt post-condensation of the TMP-including nylon 66 at 275° C. under a water vapor atmosphere. But, they say, there are signs of (undesirable) crosslinking during the later stages of irradiation.

It is known to use amines or mono- and dicarboxylic acids as chain regulators in the polymerization of polyamides, and monocarboxylic acids are very predominantly used for this purpose in practice.

It is an object of the present invention to provide inherently light- and heat-stabilized polyamides and processes for preparing them.

We have found that this object is achieved when a triacetonediamine compound of the formula

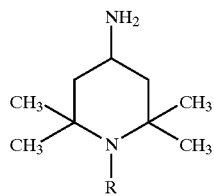

where R is hydrogen (4-amino-2,2,6,6-tetramethylpiperidine) or hydrocarbyl having from 1 to 20 carbon atoms, preferably alkyl (4-amino-1-alkyl-2,2,6,6-tetramethylpiperidine) having from 1 to 18 carbon atoms, or benzyl, is added before or in the course of the polymerization of the polyamides.

SUMMARY OF THE INVENTION

The present invention accordingly provides a process for preparing polyamides, which comprises effecting the polymerization of starting monomers in the presence of at least one triacetonediamine compound of the formula

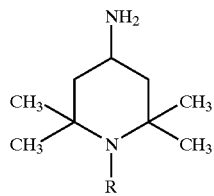

where R is hydrogen or hydrocarbyl having from 1 to 20 carbon atoms, preferably alkyl having from 1 to 18 carbon atoms, or benzyl. Preferred embodiments of the process of this invention are described in subclaims. The present invention further provides an inherently light- and heat-stabilized polyamide containing an amine radical of the formula

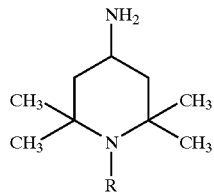

where R is as defined above, chemically bonded to the polymer chain. Preferred polyamides of this invention are defined in corresponding subclaims.

DESCRIPTION OF THE PREFERRED EMBODIMENTS

The triacetonediamine compound is added to the starting monomers or the polymerizing reaction mixture and becomes bonded to the end of the polymer chain through reaction of its primary amino group with the starting monomers or with the carboxyl groups of the polyamide being formed. The secondary amino group of the triacetonediamine compound does not react because of steric hindrance. Thus, the triacetonediamine compound also acts as a chain regulator.

The chemical bonding of the triacetonediamine compound to the polymer chain of the polyamide results in inherently stabilized polyamides being obtained. The process of this invention thus offers the advantage of obviating the otherwise necessary separate step of mixing a stabilizer into the polyamide. This eliminates problems or quality reductions as can arise on incorporation of a stabilizer following surface application to the polyamide granules as a result of incompatibility, viscosity degradation, migration, vaporization or washoff of the stabilizer or a twofold stress as with compounding, for example. The use of the triacetonediamine compound in the process of this invention protects the polyamides against damage by the action of heat and thermal oxidation in processing and use.

The polymerization of the starting monomers in the presence of the triacetonediamine compound is preferably carried out according to customary processes. For instance, the polymerization of caprolactam in the presence of triacetonediamine (R=H) can be carried out for example according to the continuous processes described in DE 14 95 198 and DE 25 58 480. The polymerization of 66 salt in the presence of triacetonediamine can be carried out by the customary batchwise process (see: Polymerization Processes p. 424–467, especially p. 444–446, Interscience, New York, 1977) or by a continuous process, for example as described in EP 129 196. In principle, the triacetonediamine compound and the starting monomers can be introduced into the reactor separately or as a mixture. The triacetonediamine compound is preferably added according to a predetermined amount/time program.

In a preferred embodiment of the process of this invention, the starting monomers used for polymerization are caprolactam or at least one dicarboxylic acid A selected from adipic acid, sebacic acid and terephthalic acid and at least one diamine selected from hexamethylenediamine and tetra-methylene-diamine, or dicarboxylic acid-diamine salts thereof. Caprolactam is particularly preferred. Dicarboxylic acid A is particularly preferably adipic acid or terephthalic acid. Given the appropriate choice of starting monomers, the polymerization will lead to the preferred polyamides nylon 6, nylon 66, nylon 46 or nylon 610.

In a preferred embodiment, the triacetonediamine compound is added to the starting monomers in an amount of from 0.03 to 0.8 mol %, preferably from 0.06 to 0.4 mol %, based on 1 mol of carboxamide groups of the polyamide. This statement of quantity relates for example to 1 mole of caprolactam when nylon 6 is to be prepared or to 0.5 mol of 66 salt when nylon 66 is to be prepared. It was found that amounts below 0.03 mol % do not ensure sufficient stabilization, whereas amounts above 0.8 mol % make it impossible to achieve the desired degree of polymerization owing to the regulating effect of the triacetonediamine compound.

In a preferred embodiment of this invention, the triacetonediamine compound is combined with at least one customary chain regulator. Examples of suitable chain regulators are monocarboxylic acids such as acetic acid, propionic acid and benzoic acid. The chain regulator combination and the amounts used are selected inter alia according to the amino end group content desired for the end product and according to the desired melt stability. The amino end group content depends on the dyeability desired for the filaments or fibers. The melt stability depends on the practical requirements of processing products, especially in relation to spinning.

The nylon 6 (polycaprolactam) prepared by the process of this invention, as well as the triacetonediamine compound, preferably contains dicarboxylic acids B as chain regulators. More particularly, such nylon 6 products, as well as possessing the requisite melt stability, the desired filament or fiber dyeability and good light and heat stability, also possess improved strength for the filaments obtained, especially filaments produced by high-speed spinning at very high rates of speed.

The dicarboxylic acids B used as chain regulators in combination with the triacetonediamine compound can be identical to or different from the dicarboxylic acids used as dicarboxylic acid A. They are preferably selected from: $C_4$–$C_{10}$-alkanedicarboxylic acids, especially adipic acid, azelaic acid, sebacic acid and dodecanedioic acid; $C_5$–$C_8$-cycloalkanedicarboxylic acids, especially cyclo-hexane-1,4-dicarboxylic acid; and also benzene- and naphthalene-dicarboxylic acids, especially isophthalic acid, terephthalic acid and naphthalene-2,6-dicarboxylic acid. The dicarboxylic acids B are preferably used in an amount of from 0.06 to 0.6 mol %, preferably from 0.1 to 0.5 mol %, based on 1 mol of carboxamide groups of the polyamide.

In another preferred embodiment, the polymerization of the process of this invention is carried out in the presence of at least one pigment. Preferred pigments are titanium dioxide or inorganic or organic coloring compounds. The pigments are preferably added in an amount of from 0 to 5 parts by weight, especially from 0.02 to 2 parts by weight, based on 100 parts by weight of polyamide. The pigments can be added to the reactor with the starting materials or separately therefrom. The use of the triacetonediamine compound (also as chain regulator constituent) distinctly improves the light stability of the polymer compared with a polymer comprising only pigment and containing no triacetonediamine.

This invention also relates to the use of inherently light- and heat-stabilized polyamide of this invention for producing filaments, fibers or films. This invention further relates to a process for producing filaments based on polycaprolactam by high-speed spinning at takeoff speeds of at least 4000 m/min and to the filaments thus obtained. In addition, this invention encompasses the use of filaments obtained according to this invention for producing fibers and fabrics and also the fibers and fabrics obtainable by this use.

The Examples which follow illustrate the invention.

General remarks concerning the Examples

The relative viscosity of the polyamides (pellets and filaments) was determined in 1% strength solution (1 g/100 ml) in concentrated sulfuric acid (96% by weight) at 25° C. The end group content was determined by acidimetric titration. The amino end groups were titrated with perchloroacetic acid in a solution in 70:30 (parts by weight) phenol/methanol. The carboxyl end groups were titrated with potassium hydroxide solution in a solution in benzyl alcohol.

The level in the polyamides of the triacetonediamine compound and of any dicarboxylic acids can be determined by hydrolyzing a sample in dilute mineral acid and analyzing the hydrolyzate by customary methods, for example by gas chromatography.

The heat stability of the polyamide filaments was determined under conditions which substantially correspond to those of heat setting processes in subsequent treatment stages, for example heat setting of BCF (bulked continuous filament) or tenter setting of textile fabrics. 5 g hanks of the drawn filaments were rapidly introduced on a holder together with the comparative samples into a through-circulation oven preheated to 185° C. and left therein for 120 seconds from reattainment of the air temperature measured in direct sample vicinity. The sample was then immediately removed and cooled down in air at 20° C. room temperature. Filaments to be compared were treated together.

The damage incurred (compared with an untreated sample of the same filament) was determined through the decrease in the relative viscosity and the amino group content and the increase in the carboxyl group content.

The absolute decrease in the basic groups is then converted into a percentage decrease, based on the untreated yarn sample, to arrive at a more useful figure for actual service.

The ultimate extension was determined using an Uster Tensorapid I and a clamped length of 200 mm in the case of partially oriented yarn (POY) filaments, of 500 mm in the case of drawn and textured filaments. The filament time-to-rupture was within the range 20±2 seconds. The pretensioning force was 0.025 cN/dtex in the case of POY and 0.05 cN/dtex in the case of drawn filaments.

The tenacity $R_H$ was calculated according to the following equation:

$$R_H = F_H / Tt_V$$

where $F_H$ is the ultimate tensile strength [cN] and $Tt_V$ is the original linear density [dtex]. The ultimate tensile strength value used was the largest value obtained in the ultimate extension measurements.

The ultimate extension $E_H$ was determined as the ratio of the length change $\Delta l$ at the moment of attainment of the ultimate tensile strength to the original length $l_V$ of the sample according to the following equation:

$$E_H = \Delta l \cdot 100\% / l_V$$

where $\Delta l$ is the difference in the length of the sample at the time of application of the ultimate tensile strength, $l_H$, and the original length $l_V$.

REPRESENTATIVE EXAMPLE 1

The polymerization reactor used was a VK tube vertical column reactor as described in EP 20946 composed of stainless steel, material No. 1,4541. The VK tube had an operating capacity of 340 l and was heated with a heat transfer oil.

A mixture of 100 parts by weight of molten caprolactam, 0.5 part by weight of water and 0.33 part by weight of terephthalic acid was continuously introduced into the first reaction zone at the top of the VK tube at a rate of 41 kg/h with stirring. At the same time, triacetone-diamine was continuously fed as a separate stream into the first reaction zone of the VK tube at a rate of 55 ml/h. The concentration of triacetonediamine was accordingly 0.087 mol %, and that of terephthalic acid 0.23 mol %, each based on 1 mol of caprolactam. The temperature of the first reaction zone was 266° C.; the pressure in the vapor phase above the first reaction zone was 1.5 bar absolute. The polycaprolactam was discharged from the VK tube at the base thereof, converted into pellets, extracted with hot water and dried. The dried polymer had a relative viscosity of 2.70, an amino end group content of 39 meq/kg and a carboxyl end group content of 65 meq/kg.

The product was spun at high speed as godet POY from jets having a hole diameter of 0.2 mm and a capillary length of 0.6 mm on an Ems-Inventa pilot spinning plant at a melt temperature of 275° C. and a rate of 23 g/min per jet.

The speeds were 4520 m/min for the 1st duo, 4530 m/min for the 2nd duo and 4500 m/min for the Barmag Craft winder.

Below the jet the filaments were cooled in a Barmag transverse flow quench box using a 20° C./65% relative humidity airstream having a velocity of 0.4 m/sec. The filaments were spin finished with a commercial spin finish composition (Limanol E 100, from Schill & Seilacher, 0.65% add-on filament) in the quench box via a metering pump and ceramic oilers. The POY had the following properties: ultimate extension 72%, tenacity 4.1 cN/dtex, Uster standard test U %=0.6

The filaments were then cold-drawn at 820 m/min on a Zinser 14 S draw-twist machine to a draw ratio of 1:1.363. The filaments thus obtained had an ultimate extension of 37%, a tenacity of 5.2 cN/dtex and an Uster uniformity U % (standard test) of 0.7. The 12 filament yarns had a linear density of 43.1 dtex.

The relative viscosity was 2.70, the amino end group concentration was 35 and the carboxyl end group concentration was 63 meq/kg.

Comparative Example 1

Commercial nylon 6 of relative viscosity 2.67 without triacetonediamine was spun under identical conditions as in Representative Example 1. The POY had the following properties: ultimate extension 73%, tenacity 4.0 cN/dtex, Uster standard test U %=0.6.

The yarn was then cold-drawn to a draw ratio of 1:1.336. The yarns thus obtained had an ultimate extension of 43%, a tenacity of 4.8 cN/dtex and an Uster uniformity U % (standard test) of 0.5. The linear density of the 12 filament yarns was 43.8 dtex. The relative viscosity was 2.66, the amino end group content was 32 meq/kg, and the carboxyl end group content was 53 meq/kg.

The yarns were subjected to a 120 s heat treatment in hot air at 185° C. and showed the following values:

TABLE 1

|  |  | Representative Example 1 | Comparative Example 1 |
| --- | --- | --- | --- |
| Relative viscosity | untreated | 2.70 | 2.66 |
|  | treated | 2.45 | 2.20 |
|  | decrease | −0.25 | −0.46 |
| Amino end groups (meq/kg) | untreated | 35 | 32 |
|  | treated | 26 | 21 |
|  | decrease | −9 | −11 |
|  | decrease (%) | −26% | −34% |
| Carboxyl end groups (meq/kg) | untreated | 63 | 53 |
|  | treated | 67 | 71 |
|  | increase | +4 | +18 |

Table 1 reveals that the nylons 6 of this invention decrease less in relative viscosity and amino group content and increase less in carboxyl group content in the heat treatment than the polyamide of Comparative Example 1 and thus possess better heat stabilization.

Representative Example 2

Caprolactam was polymerized in the same VK tube as in Representative Example 1 in the presence of 0.38 mol % of terephthalic acid, 0.20 mol % of triacetonediamine, 0.5% by weight of water and 0.3% by weight of titanium dioxide (as delusterant). The polymerization was carried out in the first reaction zone at a temperature of 255° C. and at atmospheric pressure with a throughput of 25 kg/h. The procedure was otherwise in correspondence with that described in Representative Example 1. The dried product had a relative viscosity of 2.37, an amino end group content of 45 meq/kg and a carboxyl end group content of 79 meq/kg.

The product was melted in a Barmag single-screw extruder and fed at a melt temperature of 270° C. into a Barmag SP 42 spinning system. The melt was spun at a rate of 22.6 g/min per jet through 12-hole spinning jets having capillary holes 0.20 mm in diameter and 0.60 mm in length to produce 12 filament strands having an as-spun (POY) linear density of 52 dtex and taken up at 4500 m/min. After passing through a quench box with a transverse quench flow of 0.40 m/sec and spin finishing with from 0.60 to 0.65% of a commercial spin finish composition (Limanol E 100 from Schill & Seilacher as 8% strength solution) the filament strands were taken off via 2 godet duos at 4510 m/min and 4535 m/min, respectively. The winding head used was an axially driven Barmag Craft winder. The POY had an ultimate extension of 65%, a tenacity of 4.6 cN/dtex and a boil-off shrinkage of 9%.

The POY was cold-drawtwisted at 748 m/min on a Rieter J5/10a draw-twist machine. The yarn tension in the pre-stretch zone was 0.8%, and the total draw ratio was 1:1.298.

The drawn filament yarns had an ultimate extension of 36%, a tenacity of 5.2 cN/dtex, a linear density of 44 dtex for 12 filaments and an Uster U % (standard test) of 0.7.

The relative viscosity was found to be 2.41, the amino end group content was found to be 42 meq/kg and the carboxyl end group content was found to be 74 meq/kg.

Comparative Example 2

Commercial nylon 6 having a relative viscosity of 2.39 and containing no triacetonediamine was extruded in the manner described in Representative Example 2. Cooling and spin finishing of the filaments were carried out as described above. The POY was wound up at 4500 m/min without godets. The POY had an ultimate extension of 62%, a tenacity of 4.2 cN/dtex and a boil-off shrinkage of 9%.

The POY was cold-drawn as in Representative Example 2 to a total draw ratio of 1:1.279. The drawn filament yarns had an ultimate extension of 34%, a tenacity of 4.6 cN/dtex, a linear density of 43.6 dtex for 12 filaments and an Uster value U % (standard test) of 0.9.

The relative viscosity of the yarns was 2.41, the amino end group content was 25 meq/kg and the carboxyl end group content was 65 meq/kg.

The yarns were subjected to conditions corresponding to a textile tenter setting (185° C. hot air, 120 sec) and the following properties were measured:

TABLE 2

| | | Representative Example 2 | Comparative Example 2 |
|---|---|---|---|
| Relative viscosity | untreated | 2.41 | 2.41 |
| | treated | 2.28 | 1.84 |
| | decreased | −0.13 | −0.57 |
| Amino end groups (meq/kg) | untreated | 42 | 25 |
| | treated | 34 | 13 |
| | decrease | −8 | −12 |
| | decrease (%) | −19% | −48% |
| Carboxyl end groups (meq/kg) | untreated | 74 | 65 |
| | treated | 75 | 93 |
| | increase | +1 | +28 |

Table 2 clearly shows that caprolactam polymerized to nylon 6 in the presence of triacetonediamine has better heat stabilization than the nylon 6 of Comparative Example 2, which contains no triacetonediamine.

Representative Example 3

Polyamide prepared as in Representative Example 2 but without the addition of titanium dioxide was subjected to high-speed spinning in accordance with Representative Example 2. The POY had an ultimate extension of 64%, a tenacity of 4.7 cN/dtex and a boil-off shrinkage of 10%.

The drawing was carried out under the conditions recited in Representative Example 2. Thereafter the drawn yarns had an ultimate extension of 37%, a tenacity of 5.4 cN/dtex, a boil-off shrinkage of 14%, an Uster uniformity U % (standard test) of 0.8 and a 12-filament linear density of 44 dtex.

The relative viscosity was 2.40, the amino end group content was 42 meq/kg, and the carboxyl end group content was 74 meq/kg.

Comparative Example 3A/3B 2 types of commercial nylon 6 of relative viscosity 2.40 (3A) and 2.44 (3B), respectively, were subjected to high-speed spinning in accordance with Representative Example 2. The spinning temperature was 275° C., and the speed of the godet duos was 4510 m/min and 4520 m/min, respectively.

TABLE 3

The POY had the following properties:

| | Representative Example 3A | Representative Example 3B |
|---|---|---|
| Ultimate extension | 64% | 68% |
| Tenacity | 4.4 cN/dtex | 4.2 cN/dtex |
| Boil-off shrinkage | 8% | 8% |
| Uster (standard test) U% | 0.6% | 0.5% |
| 12-filament linear density | 51 dtex | 52 dtex |

The POY was then cold-drawn on draw-twist machines to the draw ratios:

| | 1:1.257 | 1:1.313 |
|---|---|---| and had the data.

| | | |
|---|---|---|
| Ultimate extension | 44% | 38% |
| Tenacity | 5.0 cN/dtex | 4.8 cN/dtex |
| Boil-off shrinkage | 11% | 12% |
| Uster (standard test) U% | 0.6% | 0.8% |
| 12-filament linear density | 45 dtex | 43 dtex |

The following data were determined following the hot-air treatment:

| | | Rep. Ex. 3 | Comp. Ex. 3A | Comp. Ex. 3B |
|---|---|---|---|---|
| Relative viscosity | untreated | 2.40 | 2.37 | 2.45 |
| | treated | 2.19 | 1.93 | 2.23 |
| | deceased | −0.21 | −0.44 | −0.22 |
| Amino end groups (meq/kg) | untreated | 42 | 24 | 43 |
| | treated | 34 | 16 | 27 |
| | decrease | −8 | −8 | −16 |
| | decrease (%) | −19% | −33% | −37% |
| Carboxyl end groups (meq/kg) | untreated | 74 | 65 | 51 |
| | treated | 78 | 86 | 64 |
| | increase | +4 | +21 | +13 |

According to Table 3, nylon 6 of this invention has better heat stabilization than the nylon 6 types of the comparative examples.

Representative Example 4

Caprolactam was polymerized in the same VK tube as in Representative Example 1 in the presence of 0.55% by weight (0.375 mol %) of terephthalic acid, 0.33% by weight (0.239 mol %) of triacetonediamine, 0.5% by weight of water and 0.3% by weight of titanium dioxide. The polymerization was carried out in the first reaction zone at a temperature of 255° C. and at atmospheric pressure with a throughput of 25 kg/h. The procedure was otherwise in correspondence with that described in Representative Example 1. The dried product had a relative viscosity of 2.42, an amino end group content of 46 meq/kg and a carboxyl end group content of 70 meq/kg. The extractables content was 0.38%.

This was followed by godetless spinning at 4500 m/min in accordance with Comparative Example 2, then cold-drawing to a draw ratio of 1:1.229 and warping at 600 m/min.

The POY had a 12 filament linear density of 52 dtex, an ultimate extension of 59% and a tenacity of 4.1 cN/dtex.

An average of 0.5 defects/100 km were found in the Elkometer test (gap size 45 μm).

The drawn yarn has an ultimate extension of 36% and a tenacity of 4.3 cN/dtex. The 12 filament linear density was 46 dtex.

Comparative Example 4

Caprolactam was polymerized in the same VK tube as in Representative Example 4 in the presence of 0.53% by weight (0.361 mol %) of terephthalic acid, 0.5% by weight of water and 0.3% by weight of titanium dioxide. The polymerization was carried out in the first reaction zone at a temperature of 252° C. The procedure was otherwise in correspondence with that described in Representative Example 4. The dried product had a relative viscosity of 2.39, an amino end group content of 27 meq/kg and a carboxyl end group content of 92 meq/kg. The extractables content was 0.32%.

50 kg of the above nylon 6 chips were admixed with 165 g of triacetonediamine (TAD) (0.33% by weight) in liquid form by drumming on in a gyro wheel mixer for 2 hours.

The chips accordingly comprised the same amount of TAD in admixture and contained virtually the same terephthalic acid content (as part of the polymer) as the above-described product 4; the two products were identical except for the manner of the addition of the TAD.

The drummed-on TAD does not absorb completely into the chips. They remain TAD-moist and have a strong amine odor. This property is extremely disadvantageous in handling; in addition, extensive safety precautions are necessary, since TAD is corrosive.

During the residence time in the spinning system, the viscosity increases normally in the case of Representative Example 4, whereas it decreases dramatically in the case of Comparative Example 4. Other advantages of Representative Example 4 are the comparatively small change in the number of amino groups and in the extractables content (determination: 16 hours of extraction with methanol under reflux) and the fact that there is significantly less fuming in the spinneret region during spinning.

TABLE 4

Chemical data of free-fall filaments

|  | Rep. Ex. 4 | Comp. Ex. 4 |
|---|---|---|
| Relative viscosity | 2.48 (+0.06)[1] | 2.24 (−0.15)[1] |
| End groups |  |  |
| Amino (meq/kg) | 43 (−3) | 54 (+27) |
| Carboxyl (meq/kg) | 67 (−3) | 88 (−4) |
| Extract (%) | 1.4 (+1.0) | 1.8 (+1.5) |

[1]Values in brackets: change compared with chips used; in the case of Comparative Example 4, compared with the base polymer without TAD.

The spinning and further processing were carried out under the conditions recited in Representative Example 4. The POY had a 12 filament linear density of 52 dtex, an ultimate extension of 54% and a tenacity of 3.8 cN/dtex. An average of 7.5 defects (nodules, broken filaments, loops)/100 km were found in the Elkometer test.

After drawing, the ultimate extension was 35% and the tenacity 4.2 cN/dtex.

TABLE 5

|  | Rep. Ex. 4 | Comp. Ex. 4 |
|---|---|---|
| Broken filaments/100 kg | 1.2 | 4.0 |
| Elkometer test defects/100 km | 0.5 | 7.5 |
| Drawing defect/100 kg | 1.8 | 14.5 |
| Warping defect/100 km | 0.037 | >0.65 |

As is discernible from Table 5, the nylon 6 of Representative Example 4 according to the invention has lower defect numbers in all processing stages than the nylon 6 of Comparative Example 4, into which the TAD was incorporated by mixing into the polyamide.

In Representative Example 4, TAD is more completely/strongly attached in the polyamide than in Comparative Example 4. Thus, less amine passes into the aqueous phase in extraction processes (in dyeings, for example).

Following one hour extraction with boiling water under reflux of POY wound up without spin finish, the following chemical data were determined:

TABLE 6

|  |  | Rep. Ex. 4 | Comp. Ex. 4 |
|---|---|---|---|
| Rel. viscosity | before extraction | 2.42 | 2.20 |
|  | after extraction | 2.49 | 2.26 |
|  | difference | +0.07 | +0.06 |
| Amino end groups (meq/kg) | before extraction | 42 | 55 |
|  | after extraction | 42 | 50 |
|  | difference | ±0 | −5 |

As is evident from Table 6, the number of amino end groups before and after extraction remains the same in the polyamide of this invention, whereas the comparative example has fewer amino end groups after extraction. Thus, less amine passes into the aqueous phase on extraction of the polyamide of this invention.

Comparative Example 5

Commercial nylon 6 of relative viscosity 2.39, delustered with 0.3% titanium dioxide and containing no triacetonediamine was spun into filaments in the manner described in Comparative Example 2.

The POY had a 12 filament linear density of 51 dtex, an ultimate extension of 57% and a tenacity of 3.8 cN/dtex. After cold drawing to a draw ratio of 1:1.244, the values listed below in Table 7 for the untreated sample were determined.

The irradiation and the measurement of the ultimate extension and ultimate tensile strength were carried out jointly with Representative Example 5. The results are listed in Table 7.

Representative Example 5

Caprolactam was polymerized from the same starting materials and quantities under the conditions specified in Representative Example 4 using the same titanium dioxide type as in Comparative Example 5. The dried polyamide had a relative viscosity of 2.43, an amino end group content of 44 meq/kg and a carboxyl end group content of 71 meq/kg. The extractables content was 0.36%.

Spinning was carried out godetlessly at 4500 m/min as described in Comparative Example 2. The POY had a 12 filament linear density of 51 dtex, an ultimate extension of 61% and a tenacity of 4.3 cN/dtex.

After cold drawing to a draw ratio of 1:1.244, the values listed below in Table 7 for the untreated sample were determined.

The yarns were then wound on frames and irradiated for 28 days in a Xenotest 450 from Heraeus, Hanau, and the residual ultimate extension and the residual ultimate tensile strength were determined in accordance with DIN 53834 using a clamped length of 100 mm on a Zwick UPM 1425 tensile tester. The results are listed in Table 7.

TABLE 7

|  | Rep. Ex. 5 | Comp. Ex. 5 |
| --- | --- | --- |
| Untreated yarns |  |  |
| 12-filament linear density (dtex) | 44 | 44 |
| Ultimate extension (%) | 35 | 39 |
| Ultimate tensile strength (cN) | 199 | 196 |
| Tenacity (cN/dtex) | 4.52 | 4.45 |
| After 28 days' irradiation in Xenotest 450 |  |  |
| Residual ultimate extension (%) | 23 | 16 |
| (= % of original value) (%) | (66) | (41) |
|  | 136 | 97 |
| Residual ultimate tensile (cN) strength | (68) | (49) |
| (= % of original value) (%) |  |  |

It is clear from Table 7 that the polyamide prepared in the presence of triacetonediamine and $TiO_2$ (Representative Example 5) has a distinctly improved light stability compared with a comparative polymer (Comparative Example 5) including only $TiO_2$ and no triacetonediamine.

We claim:
1. A process for preparing polyamides which comprises: polymerizing caprolactam, or polymerizing at least one dicarboxylic acid selected from adipic acid, sebacic acid and terephthalic acid and at least one diamine selected from hexamethylenediamine and tetra-methylenediamine, or polymerizing dicarboxylic acid-diamine salts of said dicarboxylic acids and said diamines in the presence of at least one triacetonediamine compound of the formula

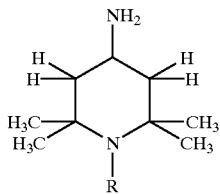

where R is hydrogen or hydrocarbyl having from 1 to 20 carbon atoms, which process is carried out in the presence of at least one pigment.

2. A process for preparing polyamides which comprises: polymerizing caprolactam, or polymerizing at least one dicarboxylic acid selected from adipic acid, sebacic acid and terephthalic acid and at least one diamine selected from hexamethylenediamine and tetra-methylenediamine, or polymerizing dicarboxylic acid-diamine salts of said dicarboxylic acids and said diamines in the presence of at least one triacetonediamine compound of the formula

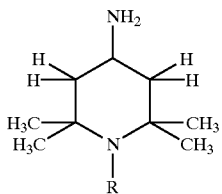

where R is benzyl.

3. A process for preparing polyamides which comprises: polymerizing caprolactam, or polymerizing at least one dicarboxylic acid selected from adipic acid, sebacic acid and terephthalic acid and at least one diamine selected from hexamethylenediamine and tetra-methylenediamine, or polymerizing dicarboxylic acid-diamine salts of said dicarboxylic acids and said diamines in the presence of at least one triacetonediamine compound of the formula

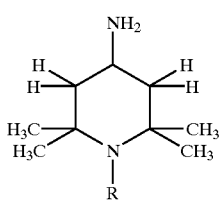

where R is hydrogen or hydrocarbyl having from 1 to 20 carbon atoms, which process is carried out in the presence of at least one chain reactor.

4. An inherently light- and heat-stabilized polyamide containing an amine radical of the formula

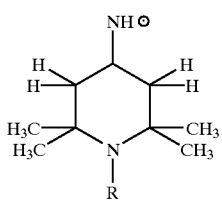

where R is hydrogen or hydrocarbyl having from 1 to 20 carbon atoms, chemically bonded to a terminal carboxyl group of the polymer chain, where the chemical bond is established prior to or during the formation of the polyamide, and further containing at least one pigment, and wherein said polyamide is specifically adapted for the manufacture of fibers and filaments.

5. An inherently light- and heat-stabilized polyamide containing from 0.03 to 0.8 mol-%, based on 1 mol of carboxamide groups of the polymer chain of the polyamide, of an amine radical of the formula

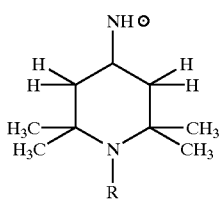

where R is hydrogen or hydrocarbyl having from 1 to 20 carbon atoms, chemically bonded to a terminal carboxyl group of the polymer chain, where the chemical bond is established prior to or during the formation of the polyamide, and wherein said polyamide is specifically adapted for the manufacture of fibers and filaments.

6. The polyamide defined in claim 5, containing from 0.06 to 0.4 mol-%, based on 1 mol of carboxamide groups of the polymer chain of the polyamide, of the amine radical.

7. An inherently light- and heat-stabilized polyamide containing an amine radical of the formula

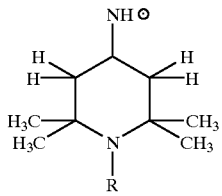

where R is hydrogen or hydrocarbyl having from 1 to 20 carbon atoms, chemically bonded to a terminal carboxyl group of the polymer chain, where the chemical bond is established prior to or during the formation of the polyamide, prepared by polymerization in the presence of at least one chain regulator, and wherein said polyamide is specifically adapted for the manufacture of fibers and filaments.

8. An inherently light- and heat-stabilized polyamide containing an amine radical of the formula

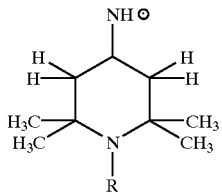

where R is benzyl, chemically bonded to a terminal carboxyl group of the polymer chain, where the chemical bond is established prior to or during the formation of the polyamide, and wherein said polyamide is specifically adapted for the manufacture of fibers and filaments.

9. An inherently stabilized polyamide containing an amine radical of the formula

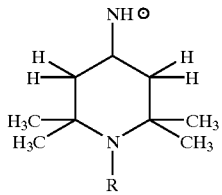

where R is hydrogen or hydrocarbyl having from 1 to 20 carbon atoms, chemically bonded to a terminal carboxyl group of the polymer chain, where the chemical bond is established prior to or during the formation of the polyamide, and further containing at least one pigment, and wherein said polyamide is specifically adapted for the manufacture of fibers and filaments.

10. An inherently stabilized polyamide containing from 0.03 to 0.8 mol-%, based on 1 mol of carboxamide groups of the polymer chain of the polyamide, of an amine radical of the formula

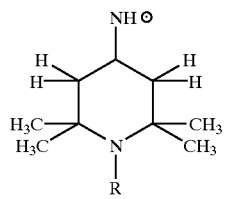

where R is hydrogen or hydrocarbyl having from 1 to 20 carbon atoms, chemically bonded to a terminal carboxyl group of the polymer chain, where the chemical bond is established prior to or during the formation of the polyamide, and wherein said polyamide is specifically adapted for the manufacture of fibers and filaments.

11. The polyamide defined in claim 10, containing from 0.06 to 0.4 mol-%, based on 1 mol of carboxamide groups of the polymer chain of the polyamide, of the amine radical.

12. An inherently stabilized polyamide containing an amine radical of the formula

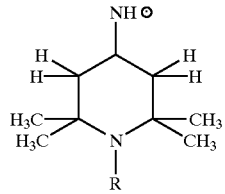

where R is hydrogen or hydrocarbyl having from 1 to 20 carbon atoms, chemically bonded to a terminal carboxyl group of the polymer chain, where the chemical bond is established prior to or during the formation of the polyamide, prepared by polymerization in the presence of at least one chain regulator, and wherein said polyamide is specifically adapted for the manufacture of fibers and filaments.

13. An inherently stabilized polyamide containing an amine radical of the formula

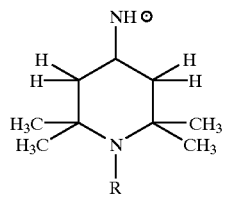

where R is benzyl, chemically bonded to a terminal carboxyl group of the polymer chain, where the chemical bond is established prior to or during the formation of the polyamide, and wherein said polyamide is specifically adapted for the manufacture of fibers and filaments.

14. A filament or fiber comprising the polyamide defined in claim 4.

15. A fabric comprising the filament or fiber defined in claim 14.

16. A filament or fiber comprising the polyamide defined in claim 5.

17. A fabric comprising the filament or fiber defined in claim 16.

18. A filament or fiber comprising the polyamide defined in claim 7.

19. A fabric comprising the filament or fiber defined in claim 18.

20. A filament or fiber comprising the polyamide defined in claim 8.

21. A fabric comprising the filament or fiber defined in claim 19.

22. A filament or fiber comprising the polyamide defined in claim 9.

23. A fabric comprising the filament or fiber defined in claim 22.

24. A filament or fiber comprising the polyamide defined in claim 10.

25. A fabric comprising the filament or fiber defined in claim 24.

26. A filament or fiber comprising the polyamide defined in claim 12.

27. A fabric comprising the filament or fiber defined in claim 26.

28. A filament or fiber comprising the polyamide defined in claim 13.

29. A fabric comprising the filament or fiber defined in claim 28.

* * * * *